US006277482B1

(12) United States Patent
Amundson et al.

(10) Patent No.: US 6,277,482 B1
(45) Date of Patent: Aug. 21, 2001

(54) FIRE RETARDING ADHESIVES

(76) Inventors: Fred J. Amundson; Frank S. Trocino, both of c/o CHEMCO Acquisitions, Inc., P.O. Box 875, Ferndale, WA (US) 98248

( * ) Notice: Subject to any disclaimer, the term of this patent is extended or adjusted under 35 U.S.C. 154(b) by 0 days.

(21) Appl. No.: 09/164,826

(22) Filed: Oct. 1, 1998

(51) Int. Cl.[7] ........................................................ B22B 7/12
(52) U.S. Cl. ........................ 428/317.7; 524/415; 524/417
(58) Field of Search ....................................... 524/417, 415; 252/606, 608, 609; 428/921, 355, 317.7; 525/489

(56) References Cited

U.S. PATENT DOCUMENTS

| 3,755,323 | * | 8/1973 | Weil et al. | 252/8.1 |
|---|---|---|---|---|
| 4,044,006 | * | 8/1977 | Weil | 544/67 |
| 4,162,279 | * | 7/1979 | Walsh et al. | 252/8.1 |
| 4,195,139 | * | 3/1980 | Goulding | 525/441 |
| 4,699,824 | * | 10/1987 | Pufahl | 428/317.7 |
| 5,162,394 | * | 11/1992 | Trocino et al. | 523/179 |
| 5,840,413 | * | 11/1998 | Kajander | 428/317.7 |
| 5,945,467 | * | 8/1999 | Iwata et al. | 523/205 |
| 5,962,603 | * | 10/1999 | Gureshi et al. | 523/179 |

* cited by examiner

Primary Examiner—Veronica P. Hoke
(74) Attorney, Agent, or Firm—Miller Nash, LLP

(57) ABSTRACT

Fire retardant adhesives obtained by combining an A Resin and a B Resin in a ratio ranging from 3:1 to 1.5:1 parts by weight of A Resin to B Resin. Methods of making the A and B resins and the adhesive, and methods of using the adhesive as such and as a coating. The A resin and the B resin each comprise a source of fire retarding phosphorus; at least one those resins comprises a source of fire retarding nitrogen; and each of the resins has constituents which can be condensed into polymeric compositions which have adhesive properties and can be thermoset.

14 Claims, No Drawings

FIRE RETARDING ADHESIVES

TECHNICAL FIELD OF THE INVENTION

The present invention relates to novel, improved materials which exhibit a combination of adhesive and fire retarding properties and to the use of such materials.

BACKGROUND OF THE INVENTION

A variety of products including chipboards and oriented strand boards are composed of adhesively-bonded pieces of wood and other flammable materials. The adhesives currently used in the manufacture of such products do nothing to reduce the flammability of the products. Adhesives with fire retarding properties would be desirable, particularly because the adhesive intimately coats the particles of the product substrate and would accordingly decrease significantly the fire hazards posed by such products.

SUMMARY OF THE INVENTION

Adhesives which are effective fire retardants have now been conceived and are disclosed herein. These novel fire retarding adhesives supply nitrogen and phosphorous for fire retardancy. They are composed of an A resin and a B resin, each made from constituents which form polymers when the pH and/or temperature of the reaction mass is adjusted to an appropriate value. Both resins also contain effective amounts of fire retarding nitrogen and/or phosphorus.

The adhesives disclosed herein are effective and durable, can be employed outdoors as well as inside, and can also be employed as fire retardant coatings.

The objects, advantages, and features of the present invention will be apparent to the reader from the foregoing, the appended claims, and the ensuing detailed description and discussion of the invention.

DETAILED DESCRIPTION OF THE INVENTION

As discussed above, the novel adhesives of the present invention contain nitrogen and phosphorous in a form which makes the adhesives effective fire retardants. Structurally, these adhesives are mixtures of thermosettable resins obtained by reacting A Resin and B resin constituents of particular character. The weight ratio of A Resin to B Resin in the adhesive prepared from those resins may range from 3:1 to 1.5:1 depending on the application for which the adhesive is destined.

Mole ratio combinations of A and B may be varied to provide for specific adhesive qualities. Resin A must be greater in proportion than Resin B in order to provide for adequate fire retardancy in the adhesive.

Resin A and Resin B can be combined to form a copolymer as soon as both resins are on hand because the combined and slightly reacted resins have a more than adequate shelf life. Combining the resins ahead of the time of use: allows the manufacturer to control mixing and reactions of the A and B resins for optimum performance of the adhesive and relieves the user/product fabricator of the adhesive of this step. Combining Resin A and Resin B at an earlier point in time also has the advantage that the bulk of the material that has to be stored is considerably reduced and that the number of items in inventory can be halved.

The bulk of the polymerization reactions effected in preparing the adhesive take place in Resin A and Resin B with there being only slight reactions to form a copolymer between the Resin A and Resin B constituents. This may be accomplished at a moderately elevated temperature—for example, 50–70 degrees C.—with the mixture of resins held at that temperature for a few—for example 5–10—minutes to ensure that the mixture copolymerizes.

Formulations for the A and B resins follow.

| Ingredient | Amount (w/w %) |
|---|---|
| A Resin | |
| (1) Melamine, urea, and/or phenol | 5–18 |
| (2) Phosphorus source | |
| (3) Glyoxal or additional aldehyde | |
| (4) Formaldehyde | 2–8 |
| (5) Water | Balance |
| B Resin | |
| (6) Formaldehyde | 9–34 |
| (7) Melamine, urea, and/or phenol | 5–18 |
| (8) Lower alkyl alcohol | 10–40 |
| (9) Phosphorus Source | |
| (10) Glyoxal or additional aldehyde | |
| (11) pH Modifier | 0.1–0.3 |

What is characterized in the foregoing formulations as "additional aldehyde can be acetaldehyde, or any other appropriate aldehyde; and the formaldehyde in both the A and B resins can be in whole or in part be replaced with another aldehyde. In any event the amounts (3) plus (10) in both formulations are preferably limited to the range of 2–18 percent.

Phosphorous is a fire retardant and the sources of that element ((2) plus (9)) are employed in amounts providing from 5 to 18 percent, calculated as elemental phosphorous and based on the weight of the adhesive (Resin A plus Resin B). The phosphorus is split between Resin A and Resin B. To resist leaching, the phosphorus must be chemically bound to the melamine or its equivalent. All of the phosphorous needed for fire retardancy cannot be tied up in Resin A, which dictates that chemically bound phosphorous also must be present in Resin B.

The melamine (or above-listed alternatives) and aldehydes condense into thermosettable polymers with adhesive properties. Urea and melamine have the additional, significant advantage of providing fire retarding nitrogen. Phenol and melamine are preferred in B resins destined for use out of doors as these compositions provide more resistance to moisture than urea.

Glyoxal is employed in the A Resin to promote the solubility in the water of the remaining A Resin constituents. The preferred alcohol in the B Resin is methanol. This B Resin constituent increases the shelf life of the A Resin/B Resin adhesive and increases the ability of the adhesive to penetrate into the pores of the material to which it is applied, thereby creating a strong bond between the elements being joined.

The methanol (or other lower alkyl alcohol) may be provided as a separate constituent and/or as an ingredient of the formaldehyde component. The alcohol is provided to cap the resin copolymers which increases the shelf life of the adhesive. Upon curing the adhesive the blocking effect of the alcohol is eliminated, which allows the polymerization reactions to proceed to the point where the adhesive becomes a thermoset, solid, insoluble material.

One phosphorous source that can be employed to advantage, especially in the A resin, is phosphoric acid. This acid can be used to control the pH of the reaction mass and, consequentially, the fire retardancy and other characteristics of the A Resin and the adhesive prepared from that resin. Nevertheless, the use of this acid is not essential. Other acids such as hydrochloric and sulfuric can be used as pH modifiers. This acid reacts with the melamine to form melamine phosphate which reacts with glyoxol to allow the melamine phosphate to be soluble in water.

pH control in the manufacture of both the A Resin and the B Resin is important from the viewpoints of fire retardancy and the service life of the equipment in which the A and B resins are manufactured. B Resins are generally formulated to provide a pH of 1–12 depending on the use to which the Resin A/Resin B combination is to be put. The pH of the A Resin is always on the acid side to provide adequate fire retardancy. The pH of the A resin is preferably in the range of 0.5–6.5. A pH approaching neutral has the advantage of minimizing corrosion of the equipment in which the resin is manufactured with acid pH's tending to promote fire retardancy. In the acidic pH environment the cellulose of a substrate such as wood dehydrates. As a result, the surface of the wood chars when the wood is heated to ignition temperature instead of burning freely. The char acts as an insulator, thus providing additional fire retardancy to the substrate.

As suggested above, fire retarding adhesives embodying the principles of the present invention can be advantageously employed in the manufacture of chipboards, strand boards, and other wood products. Woods such as cedar and Douglas fir have an acidic pH (4–4.5), and an adhesive having an A Resin component on the acidic side is preferably used to bond the elements of these products. Hemlock, as one example, has a neutral pH; and more nearly neutral A Resins may be used in adhesives intended for manufacturing products from that wood. In any event, it is important to match the pH of the adhesive to the material being bonded to minimize degradation of the wood.

That the adhesive can be manufactured with an acidic pH providing optimum fire retardancy is significant and an unexpected advantage. One would expect the reactions of both the Resin A and Resin B constituents to be uncontrollable in an acid environment but this has proven to be untrue in the process described above.

It was pointed out above that phosphoric acid is one suitable source of fire retarding phosphate ions. Other phosphate sources such as monoammonium phosphate and diammonium phosphate can be used as can mixtures of the three above-named and other amino phosphates. Monoammonium phosphate is preferred because of its acidic characteristic and low cost.

Representative fire retardant adhesives embodying the principles of the present invention and processes for making those adhesives are described in the examples which follow.

EXAMPLE I

Described in this example are adhesives intended for both indoor and outdoor use. Adhesives destined for indoor use and outdoor use are formulated somewhat differently.

One type of adhesive suitable in manufacturing products that are intended for indoor use is formulated as follows:

| Ingredient | Range (w/w %) | Preferred (w/w %) |
|---|---|---|
| A Resin | | |
| (1) Melamine | 5–18 | 7.75 |
| (2) Phosphoric Acid (75% concentration) | 15–54 | 24.75 |
| (3) Glyoxal (40% concentration) | 5–15 | 10.95 |
| (4) Monoammonium Phosphate | 15–40 | 21.43 |
| (5) Glyoxal (40% concentration) | | 10.95 |
| (6) Formaldehyde 37/25 (37% formaldehyde, 25% methanol) | 2–8 | 5.82 |
| (7) Water | Balance | 18.35 |
| B Resin | | |
| (8) Formaldehyde 37/25 (37% formaldehyde, 25% methanol, 38% water) | 37–50 | 40.36 |
| (9) Sodium Hydroxide (25%) | 0.1–0.3 | 0.14 |
| (10) Melamine | 5–18 | 14.15 |
| (11) Methanol | 0–63 | 14.42 |
| (12) Phosphoric Acid (75% concentration) | 0.1–0.3 | 0.14 |
| (13) Phosphoric Acid (75% concentration) | 15–54 | 27.74 |
| (14) Glyoxal (40% concentration) | 2–5 | 3.05 |

The 37/25 formaldehyde/methanol ratio in constituent (6) of the A Resin and constituent (8) of the B Resin is by no means critical, and these compositions can alternatively be provided separately to the resin manufacturing process. If a formaldehyde mixture is selected, products with formaldehyde/methanol ratios ranging from 37/25 to 37/63 can be used. At higher methanol ratios, the methanol listed as a separate B Resin constituent is reduced proportionately (or even eliminated).

The sodium hydroxide is a pH modifier and is employed in the manufacture of the B Resin in the amount needed to bring the formaldehyde, melamine mixture to a pH in the range of 8 to 12, typically a pH of 9.5. The alkaline pH is used to control the degree and nature of the reactions between the B Resin formaldehyde and melamine.

As indicated above, the amounts of phosphoric acid and monoammonium phosphate in the A and B Resin formulations can be varied as appropriate, nevertheless keeping the total phosphorous in the adhesive made from the resins in the 5–18 weight percent range.

Resin A, Resin B, and The Resin A/Resin B adhesive are prepared as follows:

Resin A

Step 1: mix together constituents (1), (3), (6), and (7)
Step 2: heat the step 1 mixture to 60 degrees C. and add constituent (2)
Step 3: heat the step 2 reaction mass to 107 degrees C. and hold it at that temperature until all of the other constituents have solubilized in the water.
Step 4: add ingredients (4), and (5) heat the reaction mass to 70 degrees C., and hold at that temperature for 10 minutes to complete the reactions initiated in Step 3 and this step. These reactions tie up the monoammonium phosphate in a manner which prevents degradation of the material to which the adhesive is applied.
Step 5: Cool the reaction mass to 35 degrees C. to stabilize the resin.

B Resin and

A Resin/B Resin

Adhesive

Step 1: mix together B Resin constituents (8) and (10) and adjust the pH to 9.5 by the addition of sodium hydroxide (constituent (9)).

Step 2: heat the solution formed in step 1 at 70 degrees C. until the solution becomes clear, which is an indication that the melamine has reacted to the extent that the reaction product is soluble in the water and methanol supplied by the 37/25 formaldehyde material;

Step 3: add constituent (11) and adjust the pH to 6.5 with the fraction of phosphoric acid identified as (12).

Step 4: hold the step 3 solution at 70 degrees C. for ten minutes to allow the constituents of the step 3 solution to react.

Step 5: add Resin A to the step 4 reaction mass and hold at 60 degrees C. for 10 minutes to promote the copolymerization reactions between Resin A and Resin B.

Step 6: cool the step 5 product to 35 degrees C. to stabilize the step 5 material and add Resin B constituents (13) and (14).

The precise parameters identified above are not critical but are preferably kept within the following limits:

Resin A

Step 1: Temperature: 15 to 30 degrees C.
Step 2: Temperature: 50 to 80 degrees C.
Step 3: Temperature: 90 to 110 degrees C.
Step 4: Temperature: 60 to 80 degrees C. Time: 8 to 10 mins
Step 5: Temperature: 25 to 45 degrees C.

Resin B and

Resin A/Resin B

Adhesive

Step 1: Temperature: 15 to 30 degrees C. pH: 8.5 to 12
Step 2: Temperature: 50 to 90 degrees C.
Step 3: pH: 5 to 8
Step 4: Temperature: 60 to 90 degrees C. Time: 2 to 30 mins
Step 5: Temperature: 50 to 90 degrees C. Time: 8 to 20 mins
Step 6: Temperature: 25 to 45 degrees C.

The manufacture of Resin A, Resin B, and the Resin A/Resin B adhesive may be carried out in a reactor which has a jacketed vessel equipped with an agitator and, preferably, a vacuum system and a condensor.

EXAMPLE II

Described in another fire retardant this example is an adhesive which is designed specifically for interior use.

The Resin A and Resin B components of this resin are formulated as follow with the ingredient ranges being same as set forth in EXAMPLE I:

| INGREDIENT | w/w % |
|---|---|
| RESIN A | |
| 1). Water | 18.35 |
| 2). Melamine | 7.75 |
| 3). Phosphoric acid (75% concentration) | 24.75 |
| 4). Glyoxal (40% concentration) | 10.95 |
| 5). Monoammonium Phosphate | 21.43 |
| 6.) Glyoxal (40% concentration) | 10.95 |
| 7.) Formaldehyde (37% formaldehyde, 25% methanol) | 5.82 |
| Total | 100.00 |
| RESIN B | |
| 8). Formaldehyde (50%) | 55.28 |
| 9). Methanol | 5.99 |
| 10). Water | 13.42 |
| 11). Urea | 18.41 |
| 12). Sodium Hydroxide (50%) | 3.22 |
| 13). Phosphoric Acid (75% concentration) | 3.67 |
| Total | 100.00 |

Resin A is prepared in the same manner as the EXAMPLE I A Resin (same steps, preferred process parameter, and process parameter ranges).

The protocol for preparing Resin B and the Resin A/Resin B adhesive follows:

Step 1: combine Resin B constituents (8), (9), (10), and (11) and adjust the pH of the resultant reaction mass to 9.3 with constituent (12).

Step 2: heat the step 1 reaction mass at 80 degrees C. for ten minutes and then cool the mass to 38 degrees C.

Step 3: add constituent (13), which results in an exothermic reaction. Maintain the temperature at 60 degrees C. for ten minutes.

Step 4: cool the contents of the reaction vessel to 35 degrees C. and adjust the pH to 6.9.

Step 5: add the A Resin to the reaction vessel with mixing; then hold the contents at a temperature of 60 degrees C. for ten minutes.

Step 6: cool the reaction mass to 35 degrees C. and adjust the pH of the A Resin/B Resin mass to 1.58.

As in the manufacture of the EXAMPLE I adhesive, the parameters of the process for making the adhesive described in this example can be varied. Useful process parameter ranges for the A Resin appear in EXAMPLE I. Preferred limits on the process parameters for the B Resin and the mixing of the A and B resins follow.

Step 1: Temperature: 15 to 30 degrees C. pH: 8.5 to 12
Step 2: Temperature: 60 to 100 degrees C. Time: 2 to 30 mins
Step 3: Temperature: 50 to 90 degrees C. Time: 2 to 30 mins
Step 4: Temperature: 25 to 45 degrees C. pH: 6to 8
Step 5: Temperature: 50 to 90 degrees C. Time: 2 to 30 mins
Step 6: Temperature: 25 to 45 degrees C. pH (of adhesive): 1.3 to 2.5

EXAMPLE III

Described in this example are the compositions of adhesives which embody the principles of the present invention and are designed for use out of doors and a process for manufacturing that adhesive.

| RESIN A | | |
|---|---|---|
| INGREDIENT | RANGE (w/w %)* | PREFERRED (w/w %) |
| 1) Melamine | 5–18 | 14.64 |
| 2) Glyoxal (40% Concentration) | 5–15 | 14.64 |
| 3) Phosphoric Acid (75% concentration) | | 30.36 |
| 4) Formaldehyde (37%, 25%) | 5–15 | 1.28 |
| 5) Monoammonium Phosphate | | 39.09 |

*As in EXAMPLE I for all ingredients

| RESIN B | | |
|---|---|---|
| INGREDIENT | RANGE (w/w %) | PREFERRED (w/w %) |
| 6) Phenol (90% Concentration) | 10 to 35 | 27.75 |
| 7) Formaldehyde (37%, 25%) | 25 to 88 | 53.78 |
| 8) Phosphoric Acid (75% concentration) | 1 to 5 | 2.81 |
| 9) Phosphoric Acid (75%) | 4 to 18 | 15.66 |

Resin A and The A Resin/B Resin adhesives are prepared by:

Step 1: combining ingredients (1), (2), and (4);
Step 2: adding ingredient (3), then heating the reaction mixture to and holding it at an elevated temperature until ingredients (1)–(4) have become soluble in the water supplied by ingredient (4).
Step 3: adding Resin B as next described and ingredient (5) and heating the resulting reaction mass.
Step 4: cooling the step 3 product and then mixing in reagent (9).

The Resin B component of the adhesive is prepared as follows:
Step 1: combine ingredients (6), (7), and (8).
Step 2: heat the resulting mass and hold it at an elevated temperature.
Step 3: Cool the mass.

Parameters for the process just described are:

| | Range | Preferred |
|---|---|---|
| Resin A and the A Resin/B Resin Adhesive | | |
| Step 1: Temperature (degrees C.) | 15 to 30 | |
| Step 2: Temperature (degrees C.) | 90 to 110 | 105 |
| Step 3: Temperature | 50 to 80 | 70 Degrees C. |
| Step 4: Temperature to Which The Reaction Mass is Cooled | 25–45 Degrees C. | 35 degrees C. |
| pH | 1.3–2.5 | 1.58 |
| B RESIN | | |
| Step 1: Temperature (degrees C.) | 15 to 30 | |
| Step 2: Temperature (degrees C.) | 60 to 100 | 70 degrees C. |
| Step 3: Time (mins) | 20 to 40 | 30 |

Advantages of the novel adhesives adhesive capabilities, described herein include their ability to reduce flame spread and the increased resistance to burnthrough those adhesives provide. EXAMPLE IV demonstrates the fire retardancy and the resistance of the adhesive to leaching. EXAMPLE V deals with fire retardancy with VI demonstrating the bonding capabilities of the adhesives.

EXAMPLE IV

The tests were conducted in accord with ASTM Standard 160–180. This standard describes a procedure for measuring the combustible properties of wood to determine fire retardancy. The approach is to provide a measurement of the combustibility of specimens based on the loss of weight.

Samples of the wood for each test were cut into pieces ½" by ½" by 3" long. All surfaces were smooth. Twenty-four pieces of the wood were placed in an autoclave for treating. A vacuum of 20 to 26 mm of Hg was applied to the vessel for 30 minutes. The vacuum removes most of the air located in the pockets or of the wood. This increases the resin penetration into the cells.

After the vacuum cycle was completed, the autoclave was filled with the fire retardant adhesive. Once the autoclave was completely full of adhesive, the pressure was increased to and held at 5–165 psig. The pressure and holding time were chosen to affect a predetermined uptake of the adhesive by the samples for each test.

At the end of the pressure cycle, the autoclave was returned to atmospheric pressure and the pieces of wood were removed and transferred to an oven for curing (5 days at 85 degrees C.).

After curing, the treated wood pieces were subjected to water-leaching in a water bath to simulate exposure to an outdoor environment. The water bath was a Precision Scientific Group, Model 260, Recirculation System filled with 23.103 kilograms of water. Water was circulated at a temperature of 25 degrees centigrade for 120 hours. After water-leaching the wood pieces were dried in an oven overnight.

The 24 pieces of wood for each test were stacked into a crib and burned according to ASTM Standard E160–80 to determine the "burn loss". The cribs were weighed before and after the burn. Control cribs composed of 24 similarly dimensioned strips of the same wood treated as described above but with the conventional fire retardant urea-dicyandiamide-phosphate were also constructed and burned. The results of the tests are presented below.

The test results are reported below.

| % of the Retardant Adhesive of Example III | Control, % Loss | % Loss of Weight of Test Samples | % Improvement |
|---|---|---|---|
| 22–23 | 61.8 | 33.3 | 53.4 |
| 20–21 | 68.7 | 38.5 | 56.0 |

| % of the Retardant Adhesive of Example III | Control, % Loss | % Loss of Weight of Test Samples | % Improvement |
|---|---|---|---|
| 19–19.1 | 68.8 | 37.7 | 54.8 |
| 17.1–18 | 65.7 | 45.8 | 69.7 |
| 17–1'6 | 70.35 | 46.8 | 66.4 |

An acceptable fire retardant adhesive is defined as one which will limit the loss of wood weight to 50% or less in the just described test. In every instance, the samples treated with the EXAMPLE I fire retardant adhesive passed this test by margins ranging up to 33 +percent. All of the strips treated with the conventional fire retardant failed the burn test; and, in each instance, the efficacy of the EXAMPLE I fire retardant adhesive was more than 50% greater (53+to 66%) than that of the control.

As will be apparent from these test results, adhesives embodying the principles of the present invention are also highly effective fire retardants when used as coatings.

EXAMPLE V

The test described in EXAMPLE IV was repeated, using the EXAMPLE II fire retardant adhesive but omitting the leaching step in order to emulate an indoor application of the invention. The results of this "indoor" test appear below.

| % of EXAMPLE II fire retardant adhesive Uptake | % Loss of Wood Weight |
|---|---|
| 23.5–23 | 28.6 |
| 20–20.5 | 34.1 |
| 19–19.5 | 34.1 |
| 17–17.5 | 43.3 |

Again, the 50% weight loss parameter of the ASTM Standard was passed in each instance by margins ranging from 13 to 43%.

EXAMPLE VI

Described in this example are tests of a building material (oriented strand board) conducted in accord with ASTM Standard E 84 (Surface Burning Characteristics of Building Materials).

Oriented strandboard (OSB) is made with surface layers or strands aligned in the panel direction or randomly oriented. The strands are specialized knife cut wood flakes of controlled thickness and length. The strands are blended with a thermoset resin, cured in a press and cut into panels of various dimensions.

Panels of OSB were made, using the EXAMPLE III product as a binder and fire retardant.

The basic panel properties were determined to be as follows:

| Panel | IB* PSI | MOE** Mpsi | MOR** Psi | 24 HR. Thickness Swell % |
|---|---|---|---|---|
| Control (standard OSB) | 50 | 450 | 2500 | 17.5 |
| Example III FRA**** | 133 | 755 | 5729 | 16.9 |
| Example III FRA**** duplicate | 120 | 737 | 5746 | 12.2 |

*Internal Bond
**Modulus of Elasticity
***Modulus of Rupture
****Fire Retardant Adhesive Tests of the conventional and herein disclosed panels were carried out in accordance with the ASTM Standard identified above. The test results are grouped in the following classes which are ranked in superiority in accordance with limitations of flame spread and smoke development.

Class A: Flame spread 0–25, smoke developed 0–450.
Class B: Flame spread 26–75, smoke developed 0–450.
Class C: Flame spread 76–200, smoke developed 0–450.

| Panel Type | Flame Spread Index | Smoke Development Index | Classification |
|---|---|---|---|
| Control (Standard OSB) | 131 | 122 | C |
| Control (Standard with Ex III coating) | 39 | 352 | B |
| OSB bonded with Ex 3 FRA and with Ex III coating | 19 | 187 | A |

The panels made with the EXAMPLE III fire retardant adhesive and surface coated with that product earned the highest, Category A rating while the control (conventional strand board rated the least satisfactory). It is also noteworthy that merely coating the surfaces of the standard OSB panel improved its performance rating to Category B.

The time it takes for a structural member such as a panel to burn through is another measure of fire resistance. Burn through tests of OSB panels as described above were subjected to burnthrough tests using the ASTM E 84 Standard.

The results are tabulated below.

| Panel Type | Burn Through, Min:sec | % Increase |
|---|---|---|
| Control (standard OSB) | 8:15 | N/A |
| Control standard OSB with Ex III coating two sides | 13 | 147 |
| OSB bonded Ex III with Ex III coating two sides | 18:41 | 211 |

The tabulated data show that OSB panels treated with a fire retardant adhesive in accord with the principles of the present invention are from 1.5 to two times as effective as their conventional counterparts.

Reference has been made above to ASTM Standards 160–80 and E 84. Those standards are hereby incorporated in this specification by reference.

Another highly significant and totally unpredictable advantage of the novel fire retardant adhesives disclosed herein is their ability to dramatically increase the ignition temperature of the wood on other substrate of the product. In one instance illustrating this aspect of the invention, the substrate ignition temperature was found to have been increased in this matter form 350 to 650 degrees C.

The test protocol is described in ASTM E 1623–94.

The invention may be embodied in many forms without departing from the spirit or essential characteristics of the invention. The present embodiments are therefore to be considered in all respects as illustrative and not restrictive. The scope of the invention is instead indicated by the appended claims rather than by the foregoing description, and all changes which come with in the meaning and range of equivalency of the claims are therefore intended to be embraced therein.

What is a claimed is:

1. A fire retardant adhesive comprising:

a mixture or the reaction product of a mixture of a first Resin A and a second Resin B wherein the mixture or the reaction product of the mixture has adhesive properties and is thermosettable, wherein;

Resin A comprises:
   (1) a first condensable constituent selected from the group consisting of a melamine, a urea, a phenol, or a combination of two or all of the foregoing;
   (2) a second condensable constituent which is an aldehyde; and
   (3) a source of fire retarding phosphorus selected from the group consisting of phosphoric acid, monoammonium phosphate, and diammonium phosphate, or a combination of two or all of the foregoing, in an amount greater than that necessary to catalyze the crosslinking of the Resin A and Resin B constituents and effective to impart fire retardant properties to the mixture or reaction product of the mixture of Resin A and Resin B; and wherein the first and second condensable constituents of Resin A are condensed into a composition which incorporates the source of fire retarding phosphorus; and Resin B comprises:
   (1) a first condensable constituent selected from the group consisting of a melamine, a urea, a phenol, or a combination of two or all of the foregoing;
   (2) a second condensable constituent which is an aldehyde;
   (3) a source of fire retarding phosphorus selected from the group consisting of phosphoric acid, monoammonium phosphate, and diammonium phosphate, or a combination of two or all of the foregoing, in an amount greater than that necessary to catalyze the crosslinking of the Resin A and Resin B constituents and effective to impart fire retardant properties to the mixture or reaction product of the mixture of Resin A and Resin B;
   (4) a lower alkyl alcohol; and
   (5) a pH modifier; and wherein
   the first and second condensable constituents of Resin B are condensed into a composition which incorporates the source of fire retarding phosphorus, the lower alkyl alcohol, and the pH modifier; and wherein Resin A and Resin B are combined in a ratio ranging from 3:1 to 1.5:1 parts by weight of Resin A to Resin B, and the mixture or reaction product of the mixture contains a source of fire retarding nitrogen.

2. A fire retardant adhesive as defined in claim 1 in which both Resin A and Resin B each comprise a source of fire retarding nitrogen.

3. A fire retardant adhesive as defined in claim 1 in which phosphorous is present in the adhesive in an amount ranging from 5–18 weight percent based on the total weight of the adhesive.

4. A fire retardant adhesive as defined in claim 1 in which both Resin A and Resin B comprise a pH modifier for promoting reactions between the condensable constituents of the respective resin.

5. A fire retardant adhesive as defined in claim 4 in which the pH modifier is phosphoric acid.

6. A fire retardant adhesive as defined in claim 4 in which the pH modifier is sodium hydroxide.

7. A fire retardant adhesive as defined in claim 1 in which at least one of the resins comprises a solvent and a solubilization aid for promoting the solubilization of other constituents of the resin in the solvent.

8. A fire retardant adhesive as defined in claim 7 in which the solvent is water or methanol and the solubilization aid is glyoxal.

9. A fire retardant adhesive as defined in claim 8 in which the phosphorous source in one of said resins is monoammonium phosphate and glyoxal is present in said resin in an amount effective to prevent the leaching of the monoammonium phosphate from the adhesive.

10. A fire retardant adhesive as defined in claim 1 in which the lower alkyl alcohol is methanol, and wherein the methanol is present in an amount effective to increase the shelf life of the mixture or the reaction product of the mixture.

11. A fire retardant adhesive as defined in claim 1 in which Resin A has an acidic pH.

12. A fire retardant adhesive as defined in claim 1 in which the lower alkyl alcohol is present in an amount sufficient to promote the penetration of the adhesive into the pores of a substrate to which the adhesive is applied.

13. A fire retardant adhesive as defined in claim 1 which meets the minimum standards for fire retardancy set forth in ASTM Standard E-84.

14. The combination of a fire retardant adhesive as defined in claim 1, and a substate comprising at least two components wherein the adhesive bonds the components together.

* * * * *